(12) United States Patent
Wong et al.

(10) Patent No.: US 8,493,204 B2
(45) Date of Patent: *Jul. 23, 2013

(54) DISPLAYING SOUND INDICATIONS ON A WEARABLE COMPUTING SYSTEM

(75) Inventors: Adrian Wong, Mountain View, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,636

(22) Filed: Apr. 17, 2012

(65) Prior Publication Data

US 2013/0124204 A1    May 16, 2013

Related U.S. Application Data

(63) Continuation of application No. 13/295,953, filed on Nov. 14, 2011, now Pat. No. 8,183,997.

(51) Int. Cl.
*G08B 1/08* (2006.01)
*G08B 23/00* (2006.01)
*G01S 15/00* (2006.01)
*H04R 29/00* (2006.01)

(52) U.S. Cl.
USPC .................. 340/539.11; 340/566; 340/573.1; 340/692; 340/4.4; 340/691.6; 367/99; 367/107; 367/199; 381/56; 381/57

(58) Field of Classification Search
USPC ... 340/539.11, 566, 4.4; 367/99, 107; 381/56, 381/57
See application file for complete search history.

(56) References Cited

U.S. PATENT DOCUMENTS

| | | | |
|---|---|---|---|
| 4,277,980 | A | 7/1981 | Coats et al. |
| 4,949,580 | A | 8/1990 | Graham et al. |
| 5,774,558 | A | 6/1998 | Drucker |
| 6,629,076 | B1 | 9/2003 | Haken |
| 7,199,720 | B1 | 4/2007 | Shapiro |
| 7,395,507 | B2 | 7/2008 | Robarts et al. |
| 7,680,667 | B2 | 3/2010 | Sonoura et al. |
| 7,876,914 | B2 | 1/2011 | Grosvenor et al. |

(Continued)

FOREIGN PATENT DOCUMENTS

WO    2009017797 A2    2/2009

OTHER PUBLICATIONS

Cakmakci, O., et al., "Head-Word Displays: A Review," Journal of Display Technology, vol. 2, pp. 199-216, Sep. 2006.

(Continued)

*Primary Examiner* — Donnie Crosland
(74) *Attorney, Agent, or Firm* — McDonnell Boehnen Hulbert & Berghoff LLP

(57) ABSTRACT

Example methods and systems for displaying one or more indications that indicate (i) the direction of a source of sound and (ii) the intensity level of the sound are disclosed. A method may involve receiving audio data corresponding to sound detected by a wearable computing system. Further, the method may involve analyzing the audio data to determine both (i) a direction from the wearable computing system of a source of the sound and (ii) an intensity level of the sound. Still further, the method may involve causing the wearable computing system to display one or more indications that indicate (i) the direction of the source of the sound and (ii) the intensity level of the sound.

20 Claims, 9 Drawing Sheets

U.S. PATENT DOCUMENTS

| | | | |
|---|---|---|---|
| 8,183,997 B1 * | 5/2012 | Wong et al. ............... | 340/539.11 |
| 2003/0046401 A1 | 3/2003 | Abbott et al. | |
| 2005/0071158 A1 | 3/2005 | Byford | |
| 2005/0078833 A1 | 4/2005 | Hess et al. | |
| 2006/0182287 A1 | 8/2006 | Schulein et al. | |
| 2007/0136064 A1 | 6/2007 | Carroll | |
| 2007/0195012 A1 | 8/2007 | Ichikawa et al. | |
| 2009/0278766 A1 | 11/2009 | Sako et al. | |
| 2010/0079356 A1 | 4/2010 | Hoellwarth | |
| 2011/0001695 A1 | 1/2011 | Suzuki et al. | |
| 2011/0018903 A1 | 1/2011 | Lapstun et al. | |
| 2011/0161076 A1 | 6/2011 | Davis et al. | |

OTHER PUBLICATIONS

Tan et al., "A Haptic Back Display for Attentional and Directional Cueing", Haptics-e, vol. 3, No. 1, pp. 1-20, Jun. 11, 2003.

Buchmann, "Road Stakeout in Wearable Outdoor Augmented Reality", University of Canterbury, New Zealand, 2008, Retrieved from the Internet: http://ir.canterbury.ac.nz/bitstream/10092/2958/1/thesis_fulltext.pdf.

International Search Report and Written Opinion of International Application No. PCT/US2012/060342 dated Mar. 28, 2013 (mailed Mar. 29, 2013).

* cited by examiner

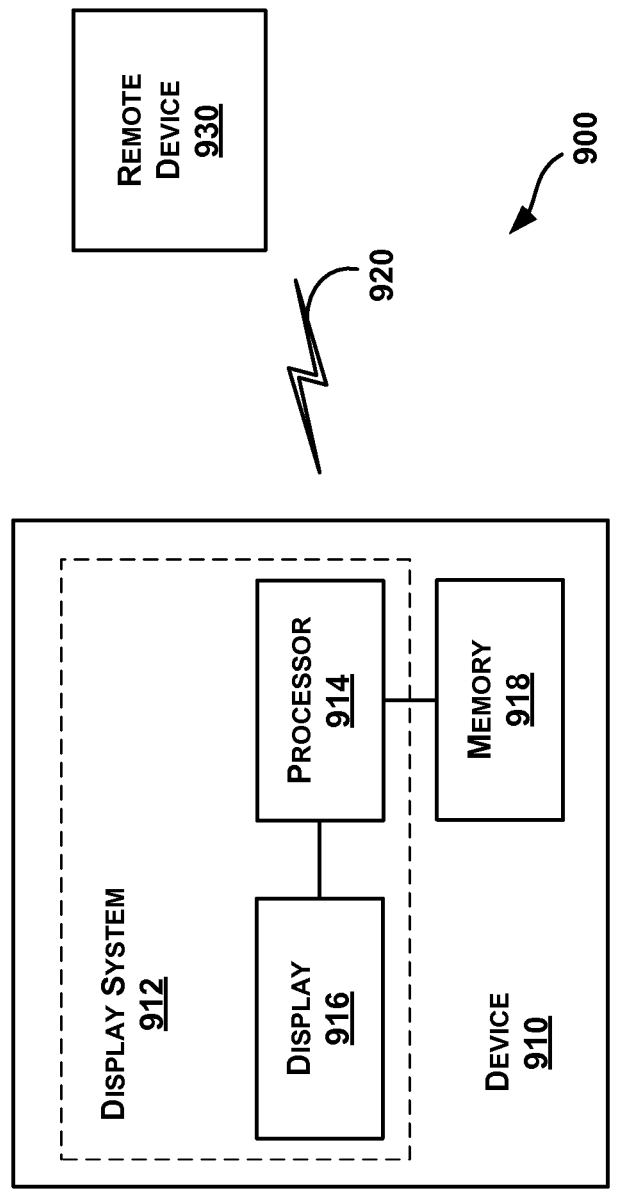

DISPLAYING SOUND INDICATIONS ON A WEARABLE COMPUTING SYSTEM

CROSS REFERENCE TO RELATED APPLICATIONS

This application is a continuation of U.S. patent application Ser. No. 13/295,953, filed Nov. 14, 2011, entitled "Displaying Sound Indications on a Wearable Computing System," the contents of which are fully incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

SUMMARY

In one aspect, an example method involves: (i) receiving audio data corresponding to sound detected by a wearable computing system; (ii) analyzing the audio data to determine both (a) a direction from the wearable computing system of a source of the sound and (b) an intensity level of the sound; and (iii) causing the wearable computing system to display one or more indications that indicate (a) the direction of the source of the sound and (b) the intensity level of the sound, wherein the wearable computing system conditions causing the wearable computing system to display the one or more indications on the intensity level being above a given threshold level.

In another aspect, a non-transitory computer readable medium having instructions stored thereon that, in response to execution by a processor, cause the processor to perform operations is disclosed. According to an example embodiment, the instructions include: (i) instructions for receiving audio data corresponding to sound detected by a wearable computing system; (ii) instructions for analyzing the audio data to determine both (a) a direction from the wearable computing system of a source of the sound and (b) an intensity level of the sound; (iii) instructions for causing the wearable computing system to display one or more indications that indicate (a) the direction of the source of the sound and (b) the intensity level of the sound; and (iv) instructions for conditioning causing the wearable computing system to display the one or more indications on the intensity level being above a given threshold level.

In yet another aspect, a wearable computing system is disclosed. An example wearable computing system includes: (i) a head-mounted display, wherein the head-mounted display is configured to display computer-generated information and allow visual perception of a real-world environment; (ii) a controller, wherein the controller is configured to receive audio data corresponding to sound detected by a wearable computing system and to analyze the audio data to determine both (a) a direction from the wearable computing system of a source of the sound and (b) an intensity level of the sound; and (iii) a display system, wherein the display system is configured to display one or more indications that indicate (a) the direction of the source of the sound and (b) the intensity level of the sound, wherein the controller is further configured to condition causing the wearable computing system to display the one or more indications on the intensity level being above a given threshold level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9 illustrates a schematic drawing of an example computer network infrastructure.

DETAILED DESCRIPTION

Figure 1:
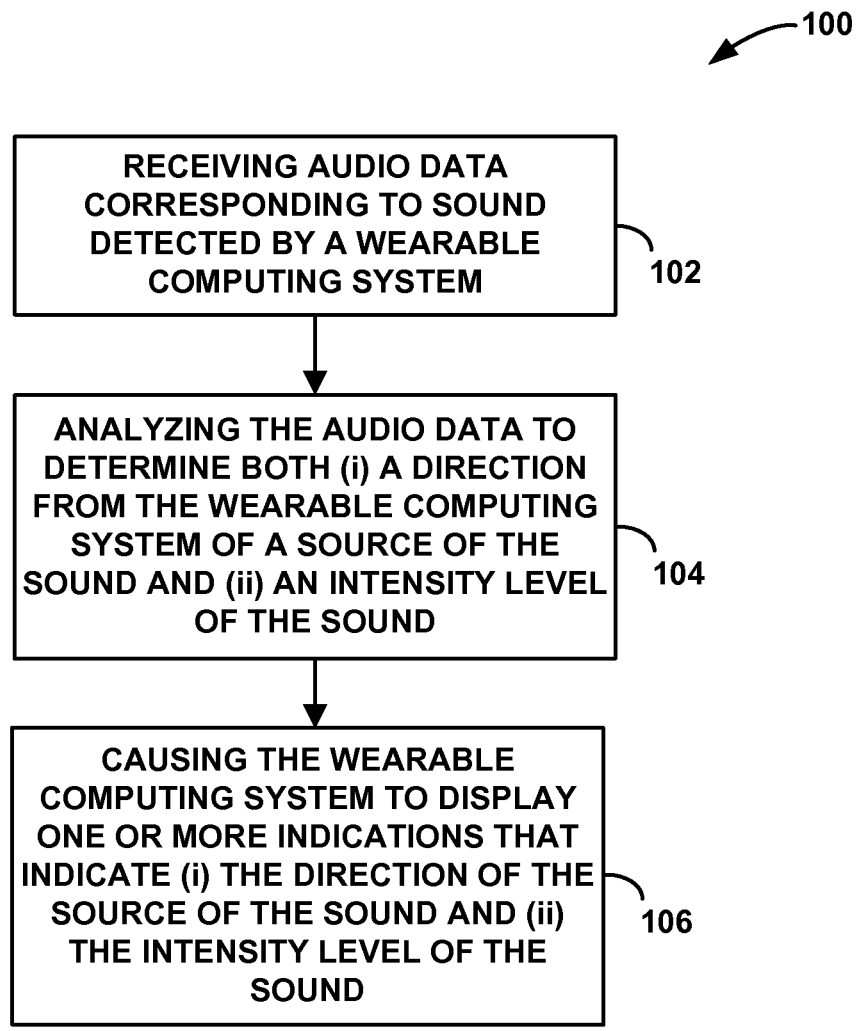
FIG. 1 is a flow chart illustrating a method according to an example embodiment.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. Overview

A wearable computing system may be configured to allow visual perception of a real-world environment and to display computer-generated information related to the perception of the real-world environment. Advantageously, the computer-generated information may be integrated with a user's perception of the real-world environment. For example, the computer-generated information may supplement a user's perception of the physical world with useful computer-generated information or views related to what the user is perceiving or experiencing at a given moment.

In some situations, a user of a wearable computing system may have difficulty hearing. For instance, the user may be hearing impaired, such as hard of hearing or even deaf. As such, it may be difficult for a user to hear the sound of the surrounding environment. Thus, it may be beneficial to provide an indication of the sound of the surrounding environment to the user. For instance, it may be beneficial to provide an indication of a direction from the wearable computing system of a source of sound and/or an intensity of the sound. As an example, a user may be at a crosswalk attempting to cross a street, and an oncoming car may be honking at the user in order to alert to the user that the car is driving through the crosswalk. In such a case, it may be helpful to indicate to the user the direction from which the honk is coming (e.g., from the left or the right), and the intensity of the honk (e.g., in order to indicate how close the oncoming car it to the user).

The methods and systems described herein can facilitate providing an indication of sound present in the surrounding real-world environment. An example method may involve: (a) receiving audio data corresponding to sound detected by a wearable computing system; (b) analyzing the audio data to determine both (i) a direction from the wearable computing system of a source of the sound and (ii) an intensity level of the sound; and (c) causing the wearable computing system to display one or more indications that indicate (i) the direction of the source of the sound and (ii) the intensity level of the sound. By displaying these one or more indications, a user may beneficially see indications of the sounds of the surrounding environment.

In accordance with an example embodiment, the wearable computing system may condition displaying the one or more indications on the intensity level being above a given threshold level. Further, many types of sound indications are possible. As an example, the indication may be a single graphic indication (e.g., an arrow) that indicates both (i) the direction of the source from the wearable computing system and (ii) the intensity level of the sound. As another example, the wearable computing system may display a first indication that indicates the direction of the source of the sound (e.g., an arrow) and (ii) a second indication that indicates the intensity level of the sound (e.g., an intensity meter).

II. Exemplary Methods

Exemplary methods may involve a wearable computing system displaying one or more sound indications for sound of the surrounding environment. FIG. 1 is a flow chart illustrating a method according to an example embodiment. More specifically, example method 100 involves receiving audio data corresponding to sound detected by a wearable computing system, as shown by block 102. The method may then involve analyzing the audio data to determine both (i) a direction from the wearable computing system of a source of the sound and (ii) an intensity level of the sound, as shown by block 104. Further, the method may then involve causing the wearable computing system to display one or more indications that indicate (i) the direction of the source of the sound and (ii) the intensity level of the sound, as shown by block 106.

Although the exemplary method 100 is described by way of example as being carried out by a wearable computing system, such as wearable computing system 600, 800, or 820, it should be understood that an example method may be carried out by a wearable computing device in combination with one or more other entities, such as a remote server in communication with the wearable computing system.

A. Receiving Audio Data Corresponding to Sound Detected by a Wearable Computing System As mentioned above, at block 102 the wearable computing system may receive audio data corresponding to the detected sound. In an example, the wearable computing system may include a plurality of microphones configured to detect the sound of the surrounding environment. Note that as used throughout the specification, "sound" may include a singular sound event present in the surrounding environment (e.g., a single thunder strike, a single musical note) or a plurality of sounds present in the surrounding environment (e.g., multiple thunder strikes, a song). In addition, the sound of the surrounding environment may come from a single sound source or multiple sound sources.

Figure 2:
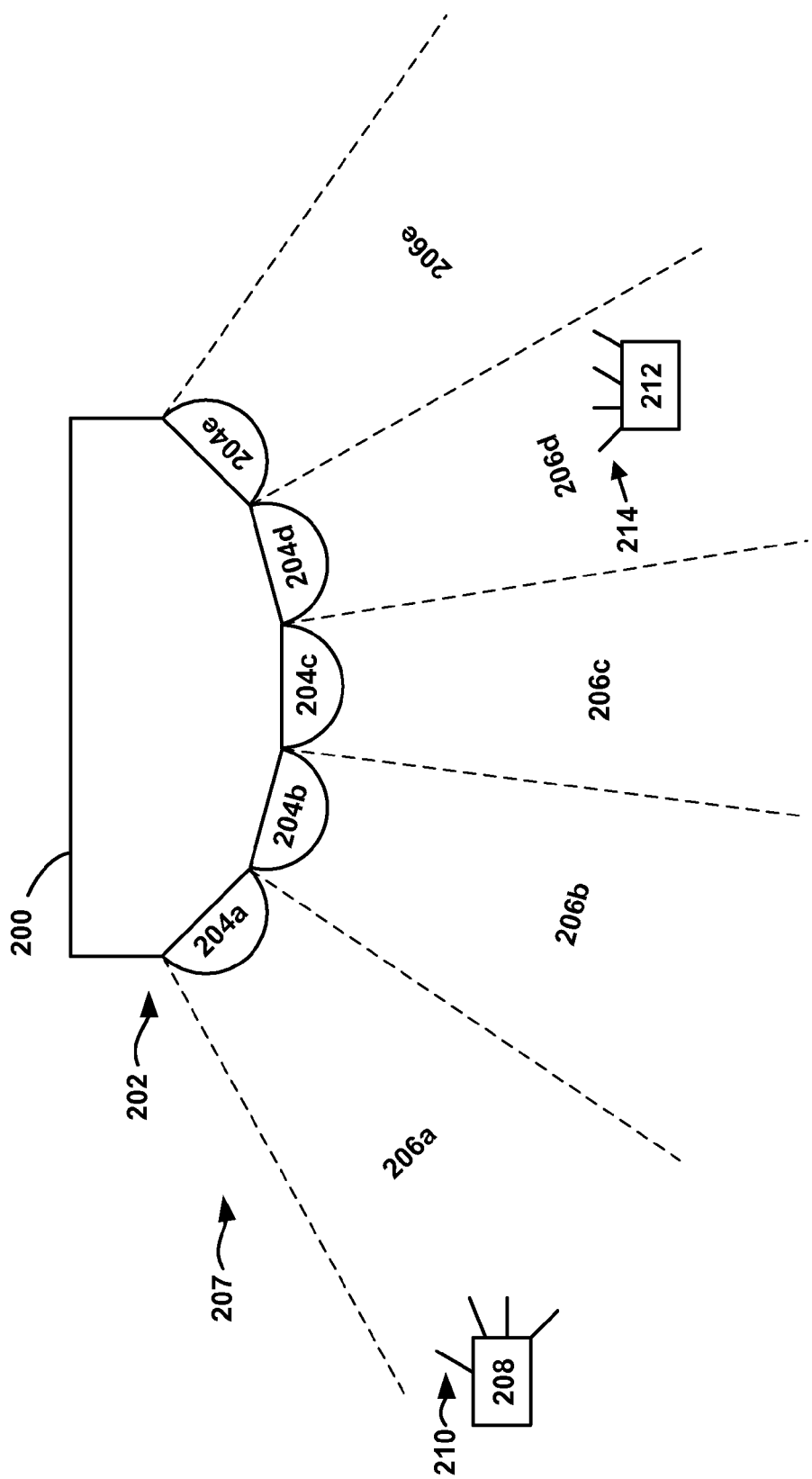
FIG. 2 is an illustration of an example microphone array, according to an example embodiment.

The plurality of microphones configured to detect the sound of the surrounding environment may be arranged in a manner to detect sound coming from a plurality of directions. For instance, the microphones may be arranged in a microphone array. FIG. 2 illustrates an example wearable computing system 200 having a microphone array 202. In particular, computing system 200 includes an array 202 of directional microphones 204a through 204e. Each directional microphone 204a through 204e is arranged so as to capture audio in its respective corresponding region 206a through 206e. Note that although each directional microphone is positioned to primarily detect sound coming from the corresponding region, the microphones may also detect sound coming from other regions.

Figure 6:
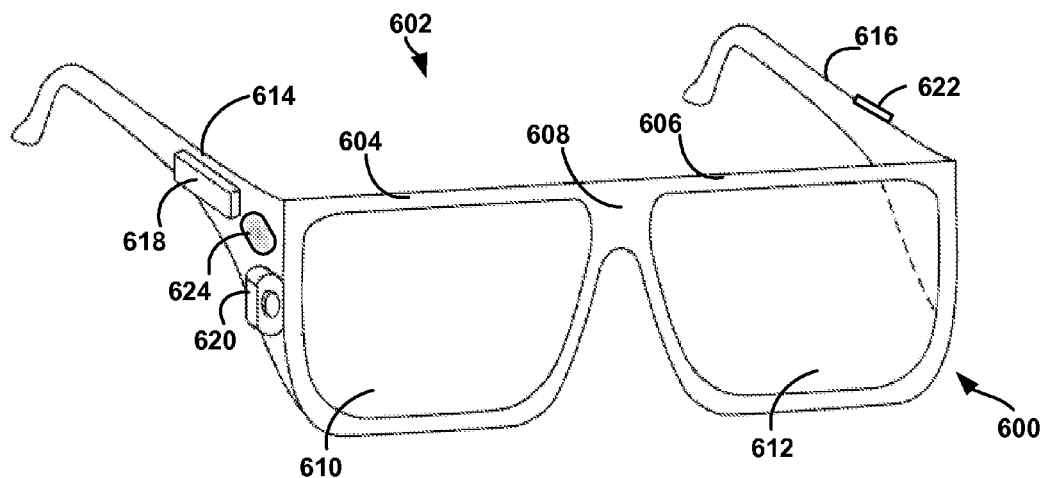
FIG. 6 illustrates an example system for receiving, transmitting, and displaying data.

In an example, the microphones of array 202 may be arranged along various points of the frame or frames of the wearable computing system, such as frames 604, 606, and 608 shown in FIG. 6. Further, note that while the array 202 is arranged to detect sounds coming from regions that span approximately 150 degrees, an array in accordance with another example embodiment may detect sounds coming from regions that span more degrees (e.g., up to 360 degrees) or fewer degrees.

In an example, with reference to FIG. 2, the surrounding environment 207 of wearable computing system 200 may include multiple sources of sound. For instance, a first source 208 of sound 210 may be located in region 206a, and a second source 212 of sound 214 may be located in region 206d. The wearable computing system 200 may receive audio data corresponding to the sound of the surrounding environment. In particular, the microphone array 202 may detect sound 210 and sound 214. In an example, each microphone may detect the sound 210 and 214. Due to the arrangement of the microphones in the array 202, each directional microphone 204a-204e may detect the sound 210 and 214 at different times and/or at different intensity levels.

B. Analyzing the Audio Data

After detecting the sound of the surrounding environment, the wearable computing system may send the audio data to a processor, such as processor 914 shown in FIG. 9, for analysis. In particular, the wearable computing system may, at block 104, analyze the audio data to determine both (i) a direction from the wearable computing system of a source of the sound and (ii) an intensity level of the sound.

In order to determine the direction from the wearable computing system of the source of the sound, the wearable computing system may analyze the audio data collected by the microphones 204a-204e. As mentioned above, in an example, each microphone may detect sound 210 and sound 214. However, each directional microphone 204a-204e may detect a sound 210 or 214 at a different time and/or at a different intensity level. For instance, sound 210 will likely be detected by microphone 204a prior to sound 210 being detected by microphones 204b-e. Similarly, sound 214 will likely be detected by microphone 204d prior to sound 214 being detected by 204a-c and 204e. Based on the time difference between the detection of the sound at the various microphones, the wearable computing system may determine the direction of the source of the sound. Such directional analysis of audio data is well known in the art. Based on the audio data detected by array 202, the system may determine that the source 208 of sound 210 is located in region 206a, and that the source 212 of sound 214 is located in region 206d.

Further, the wearable computing system may analyze the audio data to determine the intensity level (e.g., volume) of the sound. Determining the intensity level of sound is well known in the art. In an example, the intensity level may be the intensity level of the sound detected by the microphone of the region in which the sound is located. In another example, the intensity level may be an average intensity level of the sound as received by each microphone in the array.

Note that the intensity level of the sound of the surrounding environment may vary with time. For instance, source 208 may be a person talking, and the volume of the user's voice may change over time. As another example, the source may be a musical instrument outputting sound that varies in intensity over time. Other examples are possible as well.

Further, intensity measurements may aid with determining the direction of the source of the sound, as the microphones closer in proximity to the source will likely record the sound at a slightly higher intensity level.

C. Causing the Wearable Computing System to Display One or More Indications that Indicate (i) the Direction of the Source of the Sound and (ii) the Intensity Level of the Sound Responsive to analyzing the audio data, the wearable computing system may, at block 106, display one or more indications that indicate the direction of the source of the sound and the intensity level of the sound. The one or more indications beneficially may provide to the user valuable information related to the sound of the surrounding environment. For instance, these displayed indications may help to alert a hard-of-hearing user of the sound present in the surrounding environment. In another example, these displayed indications may help a hard-of-hearing user visualize the surrounding environment as it sounds.

i. Single Graphic Indication

The one or more indications may comprise a single graphic indication that indicates both (i) the direction of the source from the wearable computing system and (ii) the intensity level. For instance, the single graphic indication may be an arrow.

Figure 3A:
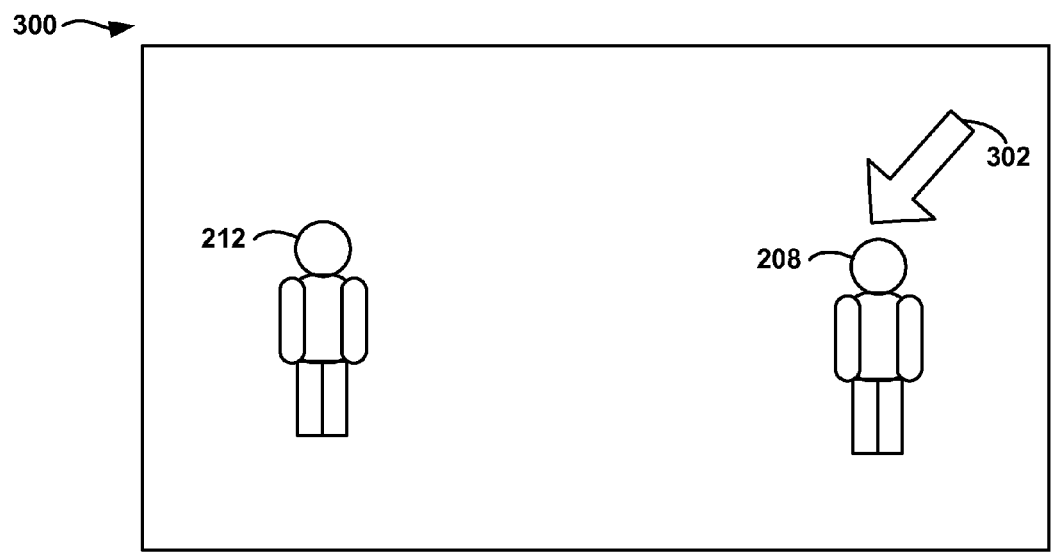
FIG. 3a is an illustration of an example display, according to an example embodiment.

FIG. 3a illustrates an example display 300 of wearable computing system 200. In this example, source 208 is the only source of sound at the time of display 300 (i.e., source 212 is not making any sound at this time). Display 300 includes a single graphic indication for sound 210. In particular, in FIG. 3a, the source 208 of sound 210 is a person speaking. The single graphic indication of arrow 302 indicates both (i) the direction of the source from the wearable computing system and (ii) the intensity level. In this example, arrow 302 is located near the source of the sound. In particular, the arrow 302 is located slightly above the source of the sound. The arrow may serve as a clear indication to the user of the direction from which the sound is coming. In other examples, the arrow could be located slightly to the left or right of the source, or perhaps overlaid over the source 208.

Figure 3B:
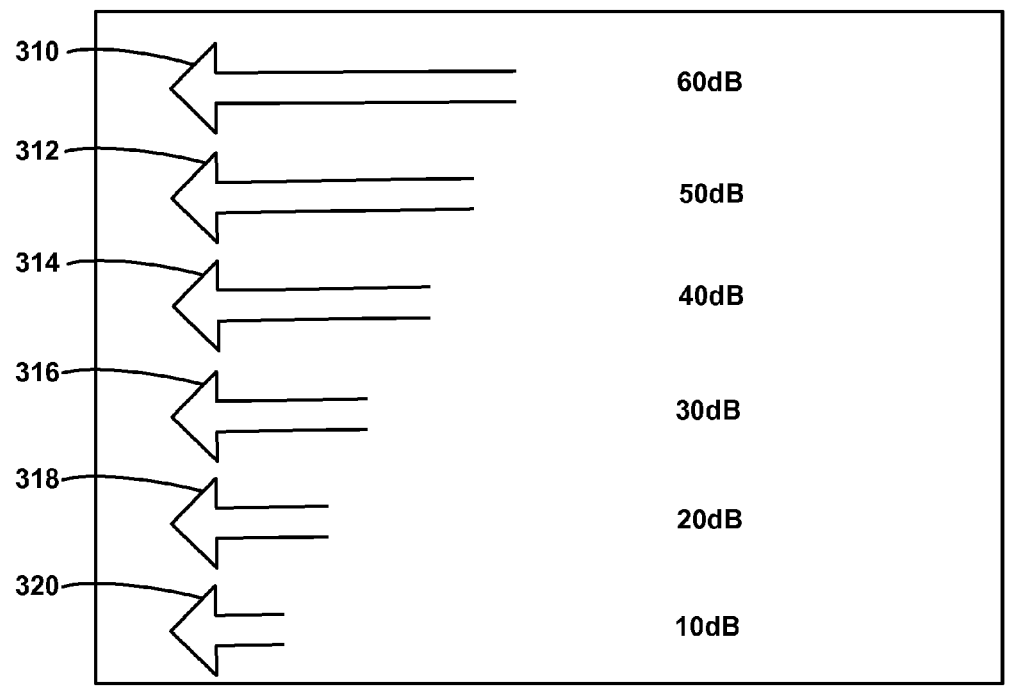
FIG. 3b is an illustration of example arrow sizes that may be included in the display of FIG. 3a, according to an example embodiment.

As mentioned above, the intensity level of the sound may vary with time. Thus, in an example, a size of the arrow varies based on the varying intensity level. For instance, a human voice may range from 0 decibels to 60 decibels (dB), depending on how loud the person is speaking. The size of the arrow in the display may change based on the intensity level of the sound 210. FIG. 3b depicts example arrow sizes that may be included in display 300. In this example, arrow 310 is correlated with 60 dB, arrow 312 is correlated with 50 dB, arrow 314 is correlated with 40 dB, arrow 316 is correlated with 30 dB, arrow 318 is correlated with 20 dB, and arrow 320 is correlated with 10 dB. Of course, arrows for other decibel levels between those mentioned may be included as well. By displaying a larger arrow for larger intensity levels, the user of the wearable computing system will know when a loud sound is present in the surrounding environment. In an example, the louder a sound in the surrounding environment, the more likely it is that a user should pay attention to or be aware of the sound. Thus, when a user sees a large arrow displayed, this display will indicate to the user to pay particular attention to the surrounding environment.

Figure 4A:
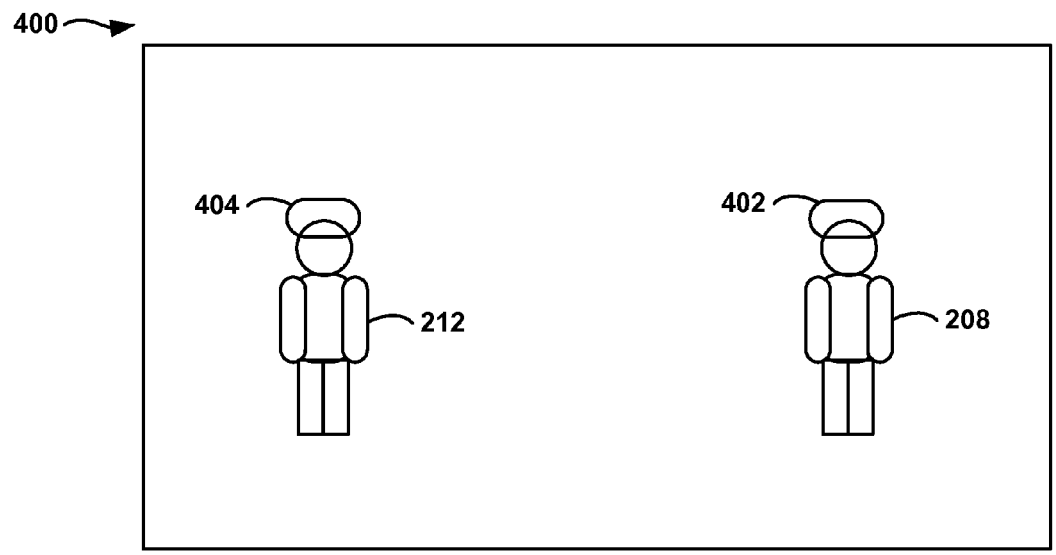
FIG. 4a is an illustration of another example display, according to an example embodiment.

As mentioned above, there may be two or more sources of sound in the surround environment. The wearable computing system may thus receive audio data corresponding to each of the plurality of sounds, and may analyze the audio data to determine both (i) a direction from the wearable computing system of each source of the sound and (ii) an intensity level of each sound. The wearable computing system may then display one or more indications for each sound to indicate the direction of the sound and the intensity level of the sound. For instance, as shown in FIG. 4a, person 208 and person 212 may be talking at the same time. FIG. 4a depicts an example display 400 that includes a first indication 402 for sound 210, and a second indication 404 for sound 214. In this example, the indications are halos above the respective speakers.

Figure 4B:
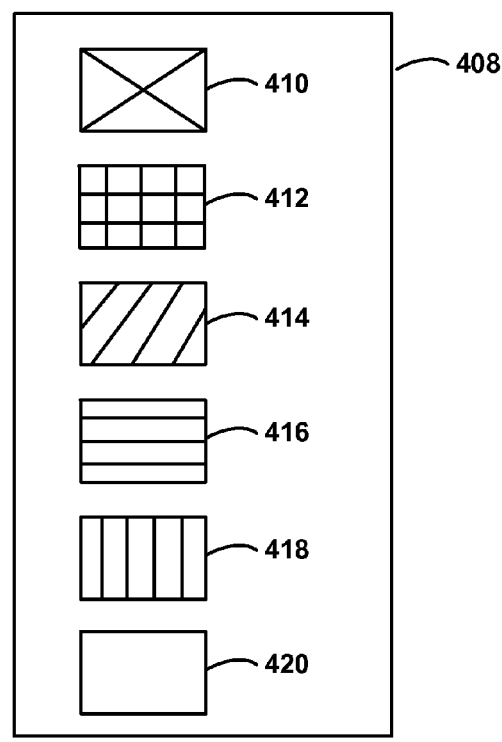
FIG. 4b is an illustration of an example color-coded scale, according to an example embodiment.

These halos indicate both the direction of the source of the sound, and may also indicate the intensity. In an example, the size of the halo could change for different intensities. However, in another example, different colors may be displayed for different intensity levels of the sound. For example, the halos could be color-coded to indicate varying intensity levels. For example, FIG. 4b depicts a scale 408 of different color codes. In this example, color 410 is correlated with 60 dB, color 412 is correlated with 50 dB, color 414 is correlated with 40 dB, color 416 is correlated with 30 dB, color 418 is correlated with 20 dB, and color 420 is correlated with 10 dB. In an example, brighter colors may be correlated with higher intensity levels.

Figure 4C:
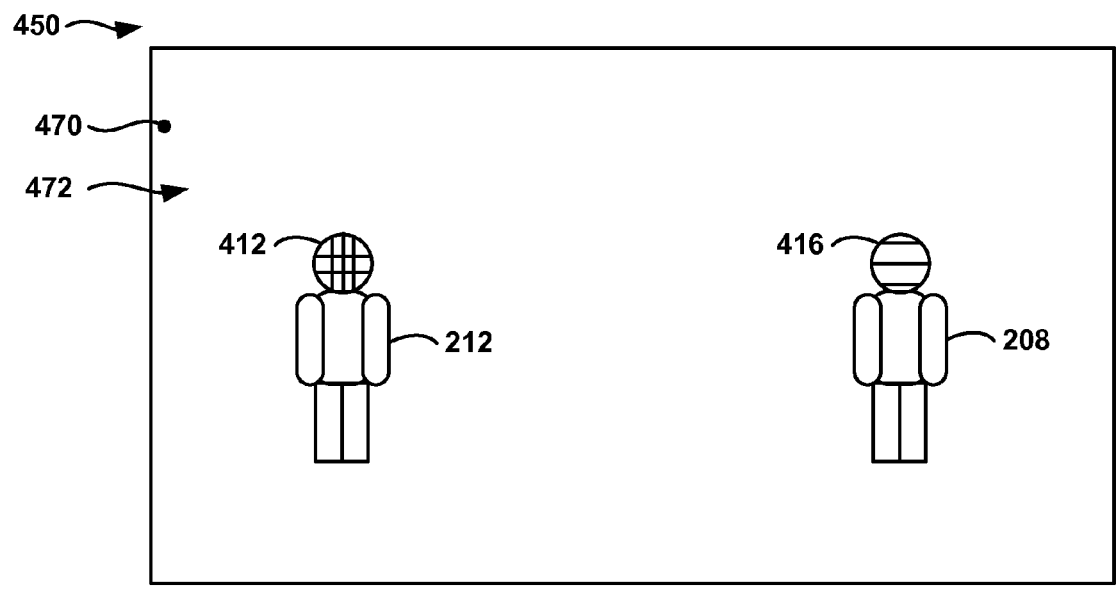
FIG. 4c is an illustration of yet another example display, according to an example embodiment.

As another example, the indication for intensity may include a color-coded sound map. For example, FIG. 4c illustrates an example display 450 with a color-coded sound map. In particular, the areas of the display that correspond to the source of sound may be colored to indicate the intensity level of the sound. Further, areas of the display that do not correspond to sources of the sound may not be colored (i.e., they may remain their natural color as perceived by the user). In this example, the source 212 is color 412, while the source 208 is color 416. Thus, the user will be aware that the sound from source 212 is louder than the sound from source 208 (i.e., the person 212 is talking more loudly than person 208).

As yet another example, an example single graphic indication may be a flashing light disposed on or near the source of sound. The location of the flashing light may indicate the direction of the source from the wearable computer, and the frequency of the flashing light may be adjusted to indicate various intensity levels.

As another example, the indication for intensity may include a circular indicator. For instance, a graphical indicator could be placed at a location on the circular indicator corresponding to the arrival angle of the sound. Further, a distance from the center of the circle could correspond to the sound intensity level. A circular indicator may be useful, for example, in the instance of a system capable of a capturing arrival angle through all 360 degrees. In an example, the circular indicator may be displayed in a periphery of a display screen of a wearable computing system, such as in one of the corners of the display screen.

Figure 10A:
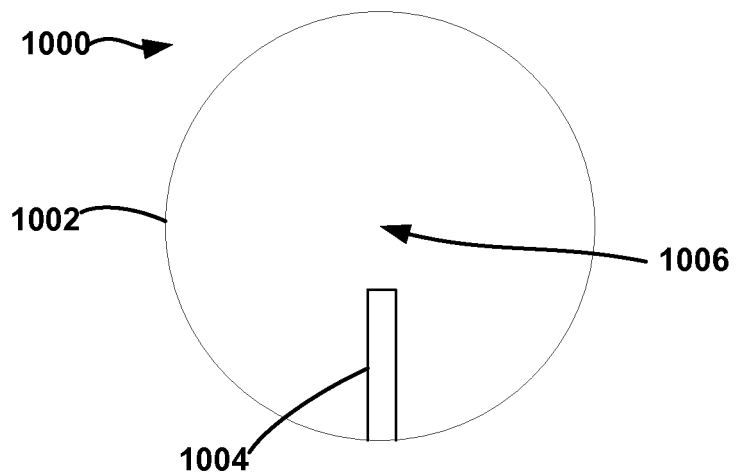
FIG. 10a is an illustration of an example sound-event indicator, according to an example embodiment.
Figure 10B:
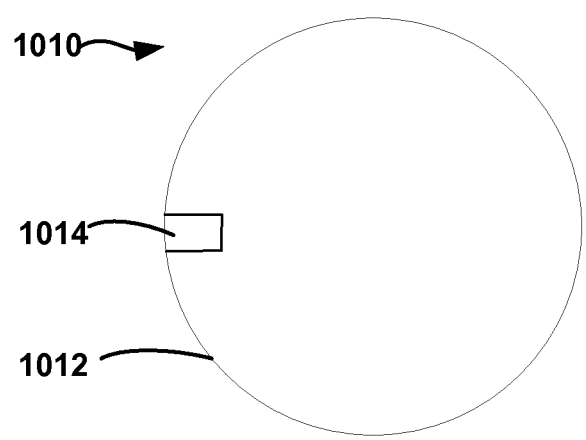
FIG. 10b is an illustration of another example sound-event indicator, according to an example embodiment.

FIGS. 10*a* and 10*b* illustrate example circular indicators. In particular, FIG. 10*a* illustrates an example circular indicator 1000. The circular indicator 1000 includes a circle 1002 and an intensity bar 1004. In this example, the location of the intensity bar 1004 may serve to indicate that the source of the sound is directly behind the user. Further, the length of the intensity bar 1004 from the center 1006 of the circle 1002 may serve to indicate the intensity level of the sound. For instance, the intensity bar may be shorter (i.e., further from the center) for a less intense sound, and the intensity bar may be longer (i.e., closer to the center) for a more intense sound. FIG. 10*b* illustrates another example circular indicator 1010. In this example, the circular indicator includes a circle 1012 and an intensity bar 1014. The intensity bar 1014 serves to indicate that the source of the sound is to the left of the user. Further, the length of the intensity bar 1014 indicates the intensity level of the sound. Compared to the sound intensity displayed in FIG. 10*a*, the intensity of the sound displayed in FIG. 10*b* is lower.

In an example, rather than including an intensity bar, the circular indicator may include an arrow that may be sized to indicate the intensity of the sound. In yet another example, the circular indicator may include a graphic located on the circle (e.g., a dot), and the dot may change color based on the intensity of the sound. It should be understood that the circular indicator may include other graphics that could serve to indicate the intensity level of the sound.

ii. Separate Indications for Direction and Intensity

Figure 5:
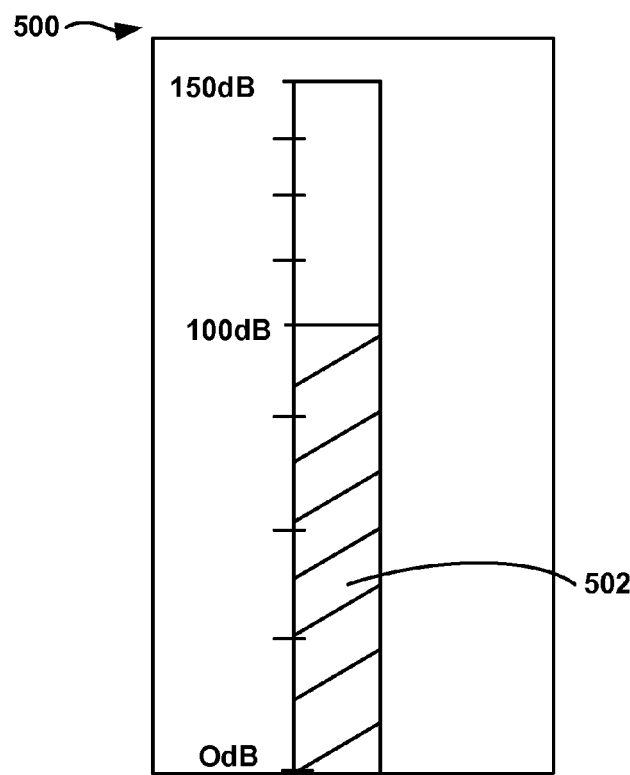
FIG. 5 is an illustration of an example intensity level meter, according to an example embodiment.

In another example, the one or more indications may comprise a first indication that indicates the direction of the source of the sound and a second indication that indicates the intensity level of the sound. For instance, the first indication may be an arrow or a halo indicating the direction of the source of the sound, and the second indication may be an intensity meter or a color-coded sound map. An example intensity meter 500 is depicted in FIG. 5. In the example, the intensity meter ranges from 0 db to 150 decibels, and a bar 502 indicates the intensity level of the sound (which, in this example, is 100 dB). The intensity level of the sound may vary with time, and thus the size of bar 502 may vary in phase with the intensity level.

An intensity meter such as intensity meter 502 could be display at various locations in the display. For example, the intensity meter could be displayed in the periphery of the display. In another example, the intensity meter could be displayed near the source of the sound. Further, in the case where there are multiple sources of sound the wearable computing system may display an intensity meter for each source of sound.

iii. Sources of Sound Outside the User's Field of View

In an example, the source of the sound may be outside a field of view of the user. The wearable computing system may provide a view of a real-world environment of the wearable computing system that spans approximately 180 degrees. The wearable computing system may detect a sound coming from a source that is outside of this view of the surrounding environment. For example, the source of the sound may be behind the user, or to the left or right of the user out of the user's peripheral vision. The wearable computing system may determine that the source of the sound is located either outside the view or in a periphery of the view. In an example, the wearable computing system may include a plurality of microphones placed around the wearable computing system, such that the microphones can detect sounds from any direction (i.e., spanning 360 degrees). For instance, the wearable computing system may include a triangular placement of three microphones spaced 120 degrees around the head of the user. Other microphone placements are possible as well.

An example indication may be a flashing light flashing light in the periphery of the view. For example, the display may include a flashing light at some point in the periphery of the display, such as at point 470 in the periphery 472 of display 450. This flashing light may indicate to the user that a sound was detected outside of the user's view.

iv. Displaying Sounds above a Threshold Intensity Level

In an example, the method may involve conditioning causing the wearable computing system to display the one or more indications on the intensity level being above a given threshold level. Thus, after determining the intensity level of the sound of the surrounding environment, the wearable computing system may determine whether the intensity level exceeds a given threshold level. If the intensity level exceed the given threshold level, the wearable computing system may display the one or more indications. However, if the intensity level does not exceed the given threshold level, the wearable computing system may not display the one or more indications.

This conditioning step may be useful, for instance, in filtering out background noise, of which the user may not be interested in seeing an indication. In an example, the wearable computing system conditions causing the wearable computing system to display the one or more indications on the intensity level being above 5 dB. Other example thresholds are possible, and the user may configure the wearable computing system with a desired threshold level, such as a threshold level between 1 dB and 20 dB.

In another example, a user may be wearing the wearable computing system, and a display of the wearable computing system may be initially powered off. For example, the display may be off for one reason or another. However, while the display is powered off, the wearable computing system may detect a sound. The system may determine that the intensity level is above a given threshold level. Responsive to determining that the intensity level is above the given threshold level, the system may activate the display in order to display the one or more indications.

v. Displaying Intensity Level Relative to Moving Average Window

In an example, rather than indicating the absolute intensity of a sound, the display of the intensity level of a sound event may be represented as the difference between the absolute intensity level of the sound event and that of a moving average window of the sound of the surrounding environment. The moving average window may be a moving average window of a predetermined duration of time. For instance, the moving average window may be 30 seconds. Of course, the moving average window could be of a longer or shorter duration.

By representing the intensity level of a sound event as the difference between the absolute intensity level of the sound event and that of a moving average window of the sound of the surrounding environment, the sound intensity displayed may be tailored to the particular environment in which a user is located. This may help serve to indicate to the user relevant sounds in the user's particular sound environment. For example, if a user of a wearable computing system is in a very quiet environment (e.g., an empty room), the last 30 seconds of average sound power will likely be low. An aberrant event could be something as quiet as a light knock on the door. The sound intensity of the light knock may be displayed relative to the likely low sound power of the last 30 seconds of average sound power.

On the other hand, if a user of a wearable computing system is in a very noisy environment (e.g., a loud factory), the last 30 seconds of average sound power will be high. Sound intensity levels may be displayed relative to the average sound intensity of the very noisy environment. In addition, as mentioned above, in some examples, the wearable computing system may condition displaying a sound intensity being above a given threshold. The given threshold may be based on an average noise floor. For instance, the given threshold for conditioning displaying a sound intensity may be greater for a loud environment than for a quiet environment. Using the examples discussed above, in the quiet environment, the average noise floor may be set at a level near the average noise level of the quiet room. On the other hand, in the loud environment, the average noise floor may be set at a level near the average noise of the loud factory. Beneficially, by adjusting the threshold level based on an average noise floor, the wearable computing system may ensure that it displays sounds that are relevant to the particular sound environment in which a user is located.

In an example, the wearable computing system may be configured to continuously run this moving-average analysis. By running the moving-average analysis continuously, a user would not have to manually change the threshold level when the user moves to a different sound environment (e.g., from a quiet environment to a loud environment).

vi. Additional Indications of Sound

In addition to displaying indications of the direction of the source of the sound from the wearable computing system and the intensity level of the sound, other sound indications are also possible. As mentioned above, the sound of the surrounding environment may be speech. In an example, the method may further comprise a speech-to-text feature determining text of the speech. After determining the text of the speech, the method may involve causing the wearable computing system to display the text of the speech. In an example, the wearable computing system may display a speech bubble above the person speaking, where the speech bubble includes the text of the speaker's speech.

Another possible sound indication is an indication that indicates what the source of the sound is. In an example, the wearable computing system may determine the source of the sound, and the wearable computing system may provide information regarding the source of the sound. The wearable computing system may analyze the audio data to determine the source of the sound, and may then display another indication that indicates the source of the sound. For example, the other indication may be a text indication that describes the source of the sound (e.g., a dog, a cat, a human, a musical instrument, a car, etc.).

For example, the wearable computing system may analyze the sound to match it to a source of the sound. In an example, a remote server may include a database of sound snippets, each snippet being correlated with a source. The server may compare the detected sound to various sounds in the database of sound snippets to identify a match. Once identifying the source of the sound, the wearable computing system may display information about the source. For example, may display information identifying the source. For example, the sound may sound from an engine of a given vehicle. The wearable computing system may display the type of vehicle it is. Other information may be provided. For example, the wearable computing system may display information related to the market price of the vehicle and/or establishments where the vehicle can be purchased. Other example information is possible as well.

In another example, the wearable computing system may display a video that corresponds to the source of the sound. For example, the wearable computing system may detect sounds from a beach (e.g., waves crashing). The wearable computing system could display a video of a beach and waves crashing. This video may help the user visualize the world as it sounds.

In yet another example, another possible sound indication is an indication that indicates the audio frequency of the sound. Audio frequency is a property of sound that, for example, determines pitch, and the audio frequency may be measured in hertz (Hz). Generally, humans typically are capable of hearing frequencies in the range of 20 Hz to 20,000 Hz. However, the range of frequencies individuals hear may be influenced by environmental factors.

The wearable computing system may analyze the sound and determine the audio frequency of the sound in a variety of ways. For example, the wearable computing system may analyze the audio frequency of the sound by algorithms either in frequency domain or time domain. The former may attempt to locate the sinusoidal peaks in the frequency transform of the input signal. The latter may use autocorrelation functions to detect similarities between the waveform and the time-lagged version of it. After determining the audio frequency of the sound, the wearable computing system may display an indication of the determined audio frequency. For example, the wearable computing system may display the determined audio frequency value. As another example, the wearable computing system may display an audio frequency scale.

Determining the audio frequency of a sound and displaying an indication of the audio frequency may be beneficial for a variety of reasons. An example benefit of being able to visualize audio frequency may be experienced in a condition where a user is exposed to high-frequency noises. In such a condition, the display of an indication of a high audio frequency can help warn the user of a sound having a high audio frequency. This warning may, for example, may serve to influence the user to take action to prevent potential hearing impairment due to the high audio frequency sound.

In still yet another example, another possible sound indication is an indication that indicates Wiener entropy. Wiener entropy can be analyzed as the ratio of geometric mean to arithmetic mean of the sound spectrum. In particular, Wiener entropy is a measure of randomness of sound on a scale between 0 and 1, which can be used to differentiate whether the sound is a white noise or a harmonic sound. Thus, a user (e.g., a user that is hard of hearing) of the wearable computing system may beneficially determine whether a sound is a white noise or a harmonic sound.

In addition to the example sound indications described above, other indications of the sound are possible as well.

III. Example Systems and Devices

FIG. 6 illustrates an example system 600 for receiving, transmitting, and displaying data. The system 600 is shown in the form of a wearable computing device. System 600 may be configured to carry out method 100. While FIG. 6 illustrates a head-mounted device 602 as an example of a wearable computing device, other types of wearable computing devices could additionally or alternatively be used. As illustrated in FIG. 6, the head-mounted device 602 comprises frame elements including lens-frames 604, 606 and a center frame support 608, lens elements 610, 612, and extending side-arms 614, 616. The center frame support 608 and the extending side-arms 614, 616 are configured to secure the head-mounted device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mounted device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614, 616 may each be projections that extend away from the lens-frames 604, 606, respectively, and may be positioned behind a user's ears to secure the head-mounted device 602 to the user. The extending side-arms 614, 616 may further secure the head-mounted device 602 to the user by extending around a rear portion of the user's head. Additionally or alternatively, for example, the system 600 may connect to or be affixed within a head-mounted helmet structure. Other possibilities exist as well.

The system 600 may also include an on-board computing system 618, a video camera 620, a sensor 622, and a finger-operable touch pad 624. The on-board computing system 618 is shown to be positioned on the extending side-arm 614 of the head-mounted device 602; however, the on-board computing system 618 may be provided on other parts of the head-mounted device 602 or may be positioned remote from the head-mounted device 602 (e.g., the on-board computing system 618 could be wire- or wirelessly-connected to the head-mounted device 602). The on-board computing system 618 may include a processor and memory, for example. The on-board computing system 618 may be configured to receive and analyze data from the video camera 620 and the finger-operable touch pad 624 (and possibly from other sensory devices, user interfaces, or both) and generate images for output by the lens elements 610 and 612.

The video camera 620 is shown positioned on the extending side-arm 614 of the head-mounted device 602; however, the video camera 620 may be provided on other parts of the head-mounted device 602. The video camera 620 may be configured to capture images at various resolutions or at different frame rates. Many video cameras with a small form-factor, such as those used in cell phones or webcams, for example, may be incorporated into an example of the system 600.

Further, although FIG. 6 illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown on the extending side-arm 616 of the head-mounted device 602; however, the sensor 622 may be positioned on other parts of the head-mounted device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mounted device 602. However, the finger-operable touch pad 624 may be positioned on other parts of the head-mounted device 602. Also, more than one finger-operable touch pad may be present on the head-mounted device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 7:
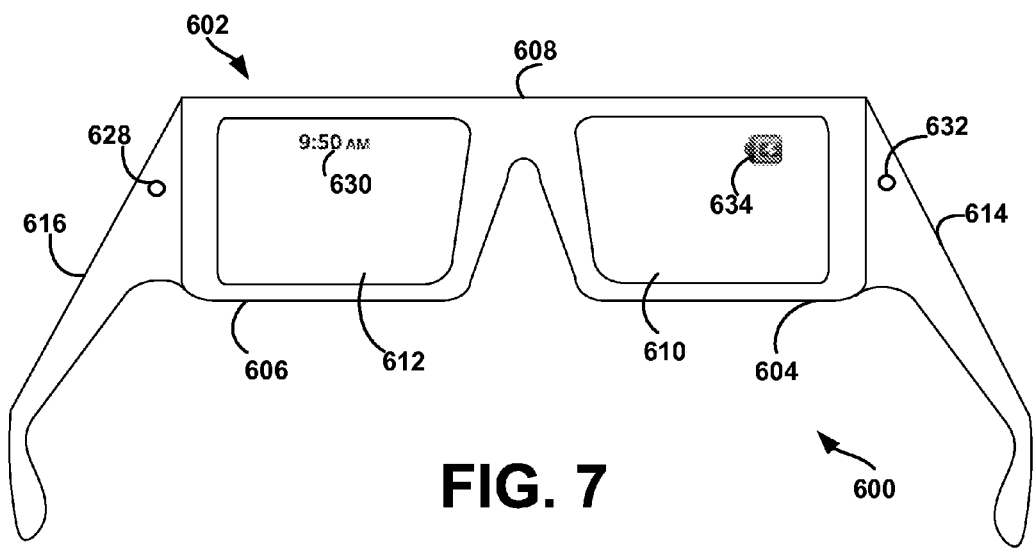
FIG. 7 illustrates an alternate view of the system illustrated in FIG. 6.

FIG. 7 illustrates an alternate view of the system 600 illustrated in FIG. 6. As shown in FIG. 7, the lens elements 610, 612 may act as display elements. The head-mounted device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may not be used (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or LED source and scanning system could be used to draw a raster display directly onto the retina of one or more of the user's eyes. Other possibilities exist as well.

Figure 8A:
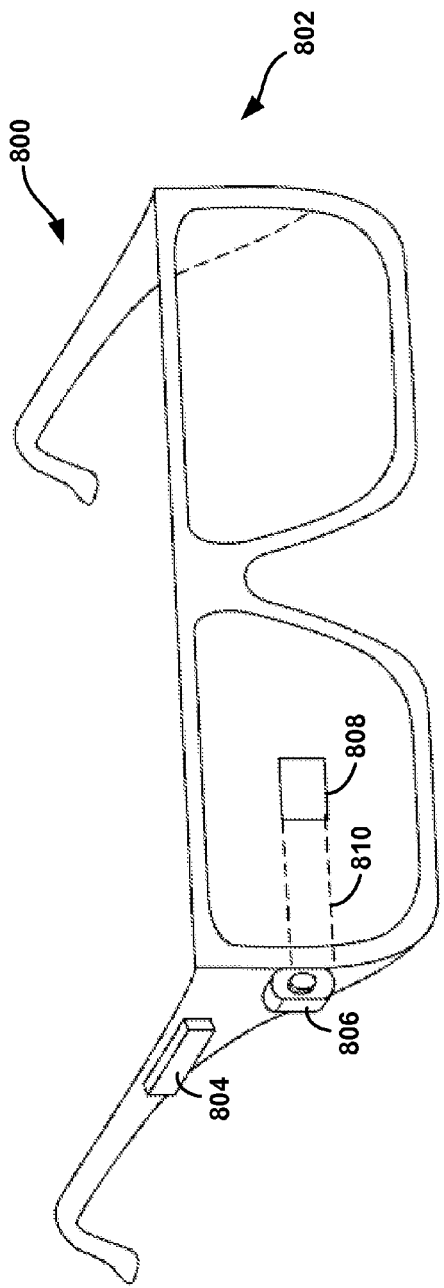
FIG. 8a illustrates an example system for receiving, transmitting, and displaying data.

FIG. 8a illustrates an example system 800 for receiving, transmitting, and displaying data. System 800 may be configured to carry out method 100. The system 800 is shown in the form of a wearable computing device 802. The wearable computing device 802 may include frame elements and side-arms such as those described with respect to FIGS. 6 and 7. The wearable computing device 802 may additionally include an on-board computing system 804 and a video camera 806, such as those described with respect to FIGS. 6 and 7. The video camera 806 is shown mounted on a frame of the wearable computing device 802; however, the video camera 806 may be mounted at other positions as well.

As shown in FIG. 8a, the wearable computing device 802 may include a single display 808 which may be coupled to the device. The display 808 may be formed on one of the lens elements of the wearable computing device 802, such as a lens element described with respect to FIGS. 6 and 7, and may be configured to overlay computer-generated graphics in the user's view of the physical world. The display 808 is shown to be provided in a center of a lens of the wearable computing device 802, however, the display 808 may be provided in other positions. The display 808 is controllable via the computing system 804 that is coupled to the display 808 via an optical waveguide 810.

Figure 8B:
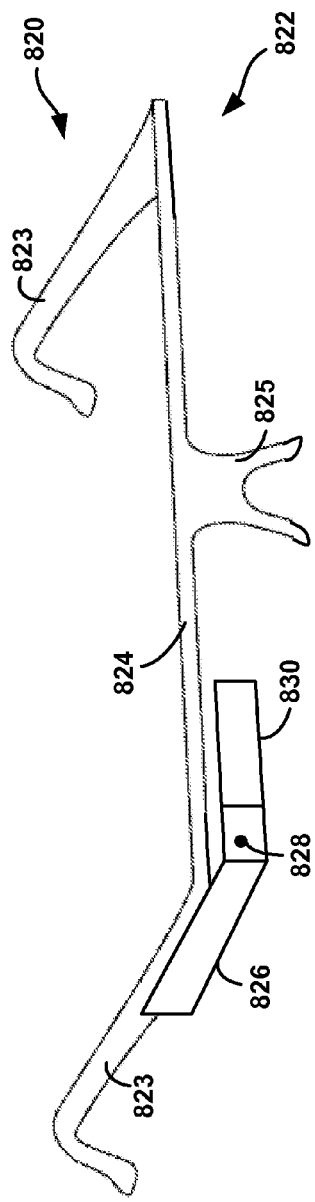
FIG. 8b illustrates an example system for receiving, transmitting, and displaying data.

FIG. 8b illustrates an example system 820 for receiving, transmitting, and displaying data. System 820 may be configured to carry out method 100. The system 820 is shown in the form of a wearable computing device 822. The wearable computing device 822 may include side-arms 823, a center frame support 824, and a bridge portion with nosepiece 825. In the example shown in FIG. 8b, the center frame support 824 connects the side-arms 823. The wearable computing device 822 does not include lens-frames containing lens elements. The wearable computing device 822 may additionally include an on-board computing system 826 and a video camera 828, such as those described with respect to FIGS. 6 and 7.

The wearable computing device 822 may include a single lens element 830 that may be coupled to one of the side-arms 823 or the center frame support 824. The lens element 830 may include a display such as the display described with reference to FIGS. 6 and 7, and may be configured to overlay computer-generated graphics upon the user's view of the physical world. In one example, the single lens element 830 may be coupled to the inner side (i.e., the side exposed to a portion of a user's head when worn by the user) of the extending side-arm 823. The single lens element 830 may be positioned in front of or proximate to a user's eye when the wearable computing device 822 is worn by a user. For example, the single lens element 830 may be positioned below the center frame support 824, as shown in FIG. 8b.

FIG. 9 illustrates a schematic drawing of an example computer network infrastructure. In system 900, a device 910 communicates using a communication link 920 (e.g., a wired or wireless connection) to a remote device 930. The device 910 may be any type of device that can receive data and display information corresponding to or associated with the data. For example, the device 910 may be a heads-up display system, such as the head-mounted device 602, 800, or 820 described with reference to FIGS. 6-8b.

Thus, the device 910 may include a display system 912 comprising a processor 914 and a display 916. The display 910 may be, for example, an optical see-through display, an optical see-around display, or a video see-through display. The processor 914 may receive data from the remote device 930, and configure the data for display on the display 916. The processor 914 may be any type of processor, such as a microprocessor or a digital signal processor, for example.

The device 910 may further include on-board data storage, such as memory 918 coupled to the processor 914. The memory 918 may store software that can be accessed and executed by the processor 914, for example.

The remote device 930 may be any type of computing device or transmitter including a laptop computer, a mobile telephone, or tablet computing device, etc., that is configured to transmit data to the device 910. The remote device 930 and the device 910 may contain hardware to enable the communication link 920, such as processors, transmitters, receivers, antennas, etc.

In FIG. 9, the communication link 920 is illustrated as a wireless connection; however, wired connections may also be used. For example, the communication link 920 may be a wired serial bus such as a universal serial bus or a parallel bus. A wired connection may be a proprietary connection as well. The communication link 920 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

With reference to FIG. 9, device 910 may perform the steps of method 100. In particular, method 100 may correspond to operations performed by processor 914 when executing instructions stored in a non-transitory computer readable medium. In an example, the non-transitory computer readable medium could be part of memory 918. The non-transitory computer readable medium may have instructions stored thereon that, in response to execution by processor 914, cause the processor 914 to perform various operations. The instructions may include: (a) instructions for receiving audio data corresponding to sound detected by a wearable computing system; (b) instructions for analyzing the audio data to determine both (i) a direction from the wearable computing system of a source of the sound and (ii) an intensity level of the sound; and (c) instructions for causing the wearable computing system to display one or more indications that indicate (i) the direction of the source of the sound and (ii) the intensity level of the sound. Further, in an example, the instructions may further include instructions for conditioning causing the wearable computing system to display the one or more indications on the intensity level being above a given threshold level.

IV. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be understood that for situations in which the systems and methods discussed herein collect and/or use any personal information about users or information that might relate to personal information of users, the users may be provided with an opportunity to opt in/out of programs or features that involve such personal information (e.g., information about a user's preferences). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
receiving audio data corresponding to sound detected by a wearable computing system;
analyzing the audio data to determine (i) a direction from the wearable computing system of a source of the sound and (ii) an intensity level of the sound; and
causing the wearable computing system to display one or more indications that indicate (i) the direction of the source of the sound and (ii) the intensity level of the sound, wherein the intensity level of the sound varies with time, and wherein the one or more indications comprise an indication associated with the intensity level that varies in phase with the intensity level.

2. The method of claim 1, wherein a display of the wearable computing system is initially powered off, the method further comprising:
after determining the intensity level, determining that the intensity level is above a given threshold level; and
responsive to determining that the intensity level is above the given threshold level, activating the display in order to display the one or more indications.

3. The method of claim 1, wherein the one or more indications comprise a single graphic indication that indicates both (i) the direction of the source from the wearable computing system and (ii) the intensity level.

4. The method of claim 3, wherein the single graphic indication is an arrow.

5. The method of claim 4, wherein a size of the arrow varies based on the varying intensity level.

6. The method of claim 1, wherein the one or more indications comprise (i) a first indication that indicates the direction of the source of the sound and (ii) a second indication that indicates the intensity level of the sound.

7. The method of claim 6, wherein the first indication is an arrow, and wherein the second indication is an intensity meter.

8. The method of claim 1, wherein the one or more indications comprise a circular indicator having a graphical indicator, wherein a location of the graphical indicator on the circular indicator corresponds to an arrival angle of the sound and a distance of the graphical indicator from a center of the circular indicator corresponds to the intensity level.

9. The method of claim 1, wherein displaying the one or more indications comprises displaying different colors for different intensity levels of the sound.

10. The method of claim 1, wherein the one or more indications comprise an intensity meter.

11. The method of claim 1, wherein the wearable computing system provides a view of a real-world environment of the wearable computing system, the method further comprising:
determining that the source of the sound is located either outside the view or in a periphery of the view, and wherein the one or more indications comprise a flashing light in the periphery of the view.

12. The method of claim 1, wherein the sound comprises speech, the method further comprising:
a speech-to-text feature determining text of the speech; and
causing the wearable computing system to display the text of the speech.

13. The method of claim 1, further comprising:
receiving audio data corresponding to a second sound detected by a wearable computing system;
analyzing the audio data to determine (i) a direction from the wearable computing system of a source of the second sound, wherein direction of the second sound is different than the direction of the sound, and (ii) an intensity level of the second sound; and
causing the wearable computing system to display one or more indications that indicate (i) the direction of the source of the second sound and (ii) the intensity level of the second sound.

14. The method of claim 1, further comprising:
analyzing the audio data to determine the source of the sound; and
causing the wearable computing system to display another indication, wherein the other indication indicates the source of the sound.

15. The method of claim 14, wherein the other indication is a text indication that describes the source of the sound.

16. The method of claim 14, wherein the other indication is a video that corresponds to the source of the sound.

17. A non-transitory computer readable medium having instructions stored thereon that, in response to execution by a processor, cause the processor to perform operations, the instructions comprising:
instructions for receiving audio data corresponding to sound detected by a wearable computing system;
instructions for analyzing the audio data to determine (i) a direction from the wearable computing system of a source of the sound and (ii) an intensity level of the sound;
instructions for causing the wearable computing system to display one or more indications that indicate (i) the direction of the source of the sound and (ii) the intensity level of the sound, wherein the intensity level of the sound varies with time, and wherein the one or more indications comprise an indication associated with the intensity level that varies in phase with the intensity level.

18. The non-transitory computer readable medium of claim 17, wherein the one or more indications comprise a single graphic indication that indicates both (i) the direction of the source from the wearable computing system and (ii) the intensity level.

19. A wearable computing system comprising:
a head-mounted display, wherein the head-mounted display is configured to display computer-generated information and allow visual perception of a real-world environment; and
a controller, wherein the controller is configured to receive audio data corresponding to sound detected by a wearable computing system and to analyze the audio data to determine (i) a direction from the wearable computing system of a source of the sound and (ii) an intensity level of the sound; and
a display system, wherein the display system is configured to display one or more indications that indicate (i) the direction of the source of the sound and (ii) the intensity level of the sound, wherein the intensity level of the sound varies with time, and wherein the one or more indications comprise an indication associated with the intensity level that varies in phase with the intensity level.

20. The wearable computing system of claim 19, wherein the one or more indications comprise a circular indicator having a graphical indicator, wherein a location of the graphical indicator on the circular indicator corresponds to an arrival angle of the sound and a distance of the graphical indicator from a center of the circular indicator corresponds to the intensity level.

* * * * *